United States Patent
Haamer (12)

(10) Patent No.: US 6,437,305 B1
(45) Date of Patent: Aug. 20, 2002

(54) METHOD AND DEVICE FOR COOKING AND VACUUM PACKING OF MUSSELS WITH MICROWAVES

(75) Inventor: Joel Haamer, Nösund (SE)

(73) Assignee: Mic Vac AB, Göteborg (SE)

( * ) Notice: Subject to any disclaimer, the term of this patent is extended or adjusted under 35 U.S.C. 154(b) by 0 days.

(21) Appl. No.: 09/719,988

(22) PCT Filed: Jun. 14, 1999

(86) PCT No.: PCT/SE99/00974

§ 371 (c)(1),
(2), (4) Date: Jan. 23, 2001

(87) PCT Pub. No.: WO00/03605

PCT Pub. Date: Jan. 27, 2000

(30) Foreign Application Priority Data

Jun. 23, 1998 (SE) .............................................. 9802212

(51) Int. Cl.⁷ ................................................ H05B 6/80
(52) U.S. Cl. ..................... 219/735; 219/725; 426/118; 426/234; 99/DIG. 14
(58) Field of Search ................................ 219/725, 734, 219/735, 762, 686; 426/118, 234, 107, 113, 241, 243; 99/DIG. 14

(56) References Cited

U.S. PATENT DOCUMENTS

| | | | |
|---|---|---|---|
| 3,637,132 A | * 1/1972 | Gray | 229/53 |
| 4,797,010 A | * 1/1989 | Coelho | 426/113 |
| 4,933,193 A | * 6/1990 | Fisher | 219/735 |
| 5,464,969 A | * 11/1995 | Miller | 219/735 |
| 5,750,967 A | 5/1998 | Sprauer, Jr. | 219/735 |
| 5,827,554 A | * 10/1998 | Guarino | 426/107 |
| 5,974,686 A | * 11/1999 | Nomura et al. | 219/735 |

FOREIGN PATENT DOCUMENTS

| | | | |
|---|---|---|---|
| EP | 0 094 362 | 11/1983 | |
| EP | 0 174 188 | 3/1986 | |
| EP | 0 242 183 | 10/1987 | |
| EP | 0 721 743 | 7/1996 | |
| GB | 1 550 000 | 8/1979 | |
| JP | 1-240475 | * 9/1989 | 219/735 |

OTHER PUBLICATIONS

International Search Report, dated Oct. 19, 1999.
International Preliminary Examination Report, dated Oct. 13, 2000.

* cited by examiner

Primary Examiner—Philip H. Leung
(74) Attorney, Agent, or Firm—Burns, Doane, Swecker & Mathis LLP

(57) ABSTRACT

The invention relates to a method and a device for cooking and vacuum packing mussels with their shell and other foodstuffs by microwave heating so that they can be stored as chilled or frozen goods for an extended period. When mussels are vacuum packed, many of the shells often break, and moreover the subsequent cooking in water is too slow for the mussel meat to coagulate satisfactorily. The invention solves this problem by packing the product to be preserved, in the first place mussels, in a somewhat flexible plastic container which is sealed. On the top side of the container there is a venting hole which permits the escape of steam during boiling but which is sealed immediately as microwave heating ceases, whereupon a vacuum arises inside the container as the steam condenses. A vacuum packed and pasturized product is thus obtained in one and the same operation.

14 Claims, 2 Drawing Sheets

METHOD AND DEVICE FOR COOKING AND VACUUM PACKING OF MUSSELS WITH MICROWAVES

BACKGROUND OF THE INVENTION

1. Field of the Invention

The invention relates to a method and device for the cooking and vacuum packing of mussels by the use of microwaves, such that said mussels can be stored as chilled or frozen goods.

2. Background Information

A dish of mussels attains its best quality when prepared from fresh, live mussels. Such mussels still retain seawater within their shells, which yields an delicious liquor when cooked. After being out of the water for a time. Mussels tend to open and the trapped water escapes, whereupon the mussels dry out and eventually die.

The smaller-sized young mussels die more rapidly in this way than large, old mussels, which remain closed for a longer time when kept out of the water.

Because of their short survival time out of water, these young mussels are never seen on sale; the fresh mussel market has to make do with older, large and often tough mussels. If it were possible, the consumer would prefer smaller young mussels with tenderer meat and a larger proportion of meat.

Mussels, like other shellfish, cannot be frozen fresh and live without first undergoing heat treatment, because when frozen fresh the meat does not coagulate satisfactorily during cooking and on final preparation the result is meat that sticks to the shell and is of poor consistency. For satisfactory coagulation of the mussel meat during cooking, the heating phase must be rapid and the mussel should be cooked through within three minutes. To achieve such rapid heating, mussels are cooked industrially in an autoclave by means of steam which is fed rapidly at approximately 125 degrees Celsius. Equally rapid coagulation can be achieved by microwave heating, but when cooked in this way the mussels "explode," whereupon the juice escapes and the mussel meat dries out.

In order to avoid oxidation (rancidity) of the fat that they contain, it is usual to vacuum pack shellfish with an inert gas, e.g. carbon dioxide. Mussels can be vacuum packed if they have strong shells, i.e. older mussels whose shells have thickened. Young mussels have thin shells which break very easily when the bag is evacuated, and these mussels are therefore very difficult to pack in vacuum bags without excessive shell breakage.

If a vacuum-packed bag of mussels is heated in a microwave oven, the bag expands and bursts as the water contained in the mussels is vaporised. For this reason such bags are generally heated in water, in which case heating does not take place as quickly is desirable in order for the mussel meat to coagulate in a satisfactory manner (see above). To achieve sufficiently rapid cooking of vacuum packed mussels a retort cooker with overpressure facility is used (Patent No EP 0 721 743 Al Turner Nelson NZ). The entire process including come-up time and cooling in the cooker takes approximately 30 minutes and the cooking process cannot be made continuous. By comparison, in the present method, evacuation and cooling take place in the same operation in less than five minutes in a process which can be made continuous in a microwave tunnel.

There exist special packages and containers for heating by microwave energy: EP Patent No 0 174 188 relates to a gas-tight plastic can having a valve which is opened once to release overpressure as the can is heated. This patent relates to the sealing of the vent opening, which is designed to open spontaneously during microwave heating. U.S. Pat. No 5,750,967 relates to a plastic container for the storage and microwave heating of foodstuffs, which container can be reused. A valve is provided on the upper side of the pack to release overpressure arising during cooking and to admit air during cooling, so that the pack does not deform. Furthermore, UK Patent No 1 550 000 (Unilever) relates to a packaging which is vented in a special way during heating and cooling so that vacuum does not arise inside the packaging.

One method of producing frozen mussels in their shells is to pack said mussels prior to cooking into a large (approx. 40 kg) container which is then submerged in hot water (EP 0 094 362 Al Lars Goran Carlsson). After heating, the container is frozen with the mussels inside. When the mussels are frozen, the container is opened and the mussels are removed and shaken apart in their frozen state so that they are single. This process too requires mussels with thick shells so that they do not break during handling. The final product is single cooked mussels with shells. In this patented process, once again, the cooking is too slow (see above), the final product is not pasteurised, and the process requires mussels with thick shells, i.e. old, larger mussels.

SUMMARY OF THE INVENTION

The purpose of the invention is to make possible the use of young, thin-shelled mussels which according to most connoisseurs have the best consistency, size and taste, for a pasteurised or frozen product which can be stored for a considerable time prior to its final use. The same invention is also suitable for the packaging of other liquid or solid foodstuffs industrially or for home use in order to obtain a pasteurised or frozen product.

In accordance with the purpose of the invention, as one aspect of the invention, a method is provided for the cooking and vacuum packing of food, such as mussels, comprising heating food in a container, wherein the container is provided with a venting opening for the release of overpressure during boiling. Microwave energy may then be used to heat and cook the food, resulting in steam being formed inside the container. Excess steam and air may then exit through the venting opening, which is sealed manually or automatically when the input of microwave energy is ceased. As the container cools, steam therein condenses, whereupon a vacuum arises inside the container. Due to the use of a flexible container, the container molds itself to its contents as the vacuum arises in the container.

In accordance with another aspect of the invention, a device for cooking and vacuum packing food, such as mussels, is provided which comprises a flexible container made of material which can withstand microwave heating and frozen storage and is tough enough to be suitable for vacuum packing. A venting opening is provided on the top side of the container through which air and steam can escape during boiling, and which may be sealed manually or automatically by means of self-adhesive tape as soon as boiling ceases. The flexible container molds itself to the food when a vacuum arises in the container as steam condenses due to cooling of the container following cessation of microwave heating.

DETAILED DESCRIPTION OF THE PREFERRED EMBODIMENTS

Figure 1A:
FIGS. 1A to 1E schematically illustrate a method of packaging, cooking and vacuum packing food, such as mussels.
Figure 1B:
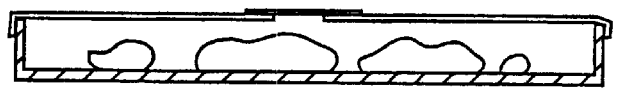
Figure 1C:
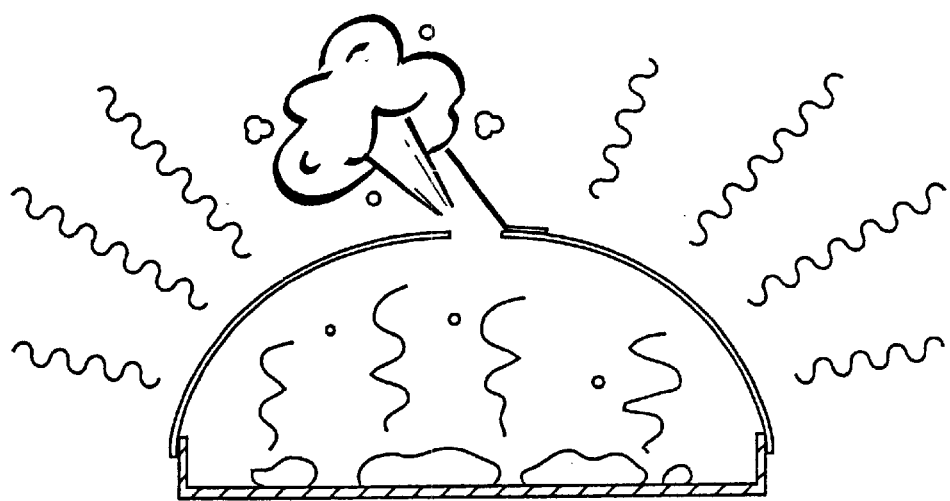
Figure 1D:
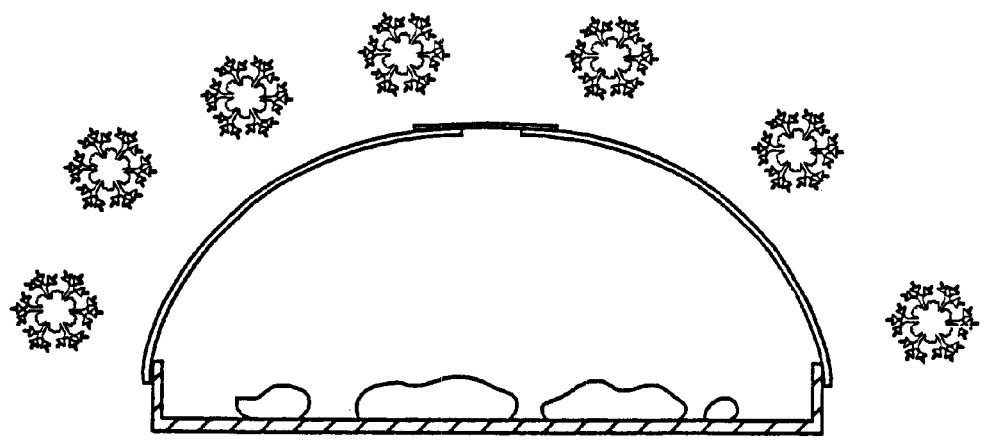
Figure 1E:
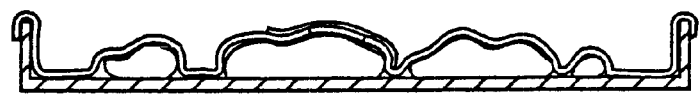

One embodiment of a microwaveable container and process for the packaging, cooking and vacuum packing of mussels by the use of microwaves is illustrated in FIGS. 1A to 1E of the drawings. In FIG. 1A, mussels or other food 1 may be placed in a flexible container 4, such as a plastic tray. The container may then be covered with a material 6, as shown in FIG. 1B, that can withstand microwave heating and frozen storage and is tough enough to be suitable for vacuum packing. The covering for the container may be, e.g., a lid having a venting opening 8. Upon the application of microwave energy 10 to the container and the food inside the container (FIG. 1C), the food is heated and cooked. Steam and air 12 resulting from the heating process escape through the venting opening 8. Cessation of heating by microwave energy leads to cooling and the closing of the venting opening, as depicted in FIG. 1D. As steam condenses during the cooling process, a vacuum arises. The flexible container molds itself at least to some degree to the contents of the container, as illustrated in FIG. 1E, thereby producing a vacuum packed food container.

The container is made of a plastics material capable of withstanding microwave cooking and freezing without bursting. The shape and size of the container is determined by the requirement that the temperature at every point inside the container be raised to boiling point by means of microwaves together with thermal conduction within approximately four minutes. At an input of 1 kilowatt of microwave energy the maximum quantity of mussels permitting sufficiently rapid coagulation throughout the whole container is approximately 400 grams.

On the upper side of the container there is an opening (diameter approx. 5 mm) which permits the escape of air and steam when the product inside the container is brought to the boil. When the input of microwave energy has ceased, the opening is sealed and the steam begins to condense inside the container. During condensation a vacuum arises and the container must be flexible enough to mold itself to its contents to some degree.

When mussels have been processed, a round can of diameter 110 mm and height 80 mm with an airtight lid was used. An opening is provided in the lid. The can is completely filled with mussels, sealed, and brought to boiling point in a microwave oven. During boiling, each mussel is able to release the overpressure arising inside its shell without exploding, as there is room for the shell to open slightly. The overpressure inside the container is released through the opening. When boiling ceases, the opening is immediately closed with self-adhesive tape and the can contracts somewhat, while the mussel shells inside the can close up completely. The fact that the mussels inside the container are closed also helps to prevent the drying out of the mussel meat during extended frozen storage of the package.

What is claimed is:

1. A method for the cooking and vacuum packing of mussels or other shellfish comprising, placing mussels or other shellfish that is to be cooked and vacuum packed inside a container, wherein said container is provided with a venting opening for the release of overpressure during boiling;

subjecting the container containing the mussels or other shellfish to microwave energy to heat the mussels or other shellfish; and ceasing the application of microwave energy such that the venting opening closes and, as the container cools, steam therein condenses, whereupon a vacuum arises inside the container;

wherein, said cooking and vacuum packing take place in the same operation in the container wherein the mussels or other shellfish remain during subsequent storage, and said container is flexible and molds itself to the mussels or other shellfish as the vacuum arises inside the container.

2. A method according to claim 1, wherein the container containing the mussels or other shellfish is in the form of a ready-to-eat meal.

3. A method according to claim 1, wherein the container containing the mussels is in the form of a ready-to-eat meal.

4. A method according to claim 1, further comprising, after placing the mussels or other shellfish that is to be cooked and vacuum packed inside the container, covering the mussels or other shellfish with a material that can withstand microwave heating and frozen storage, and which is suitable for vacuum packing.

5. A method according to claim 1, wherein the material covering the mussels or other shellfish has a venting opening.

6. A method according to claim 1, wherein the container is a plastic can.

7. A method according to claim 1, wherein the container is a plastic bag.

8. A method according to claim 1, wherein the container is a plastic tray.

9. A device for cooking and vacuum packing mussels or other shellfish, comprising a flexible container made of material which can withstand microwave heating and frozen storage and is tough enough to be suitable for vacuum packing;

wherein, a venting opening is provided on the top side of the container through which air and steam can escape during boiling, and which is capable of being sealed manually or automatically by means of self-adhesive tape as soon as boiling ceases; and the container is flexible so that it molds itself to the mussels or other shellfish when a vacuum arises in the container as steam condenses due to cooling of the container following cessation of microwave heating.

10. A device according to claim 9, wherein the mussels have shells and the container is flexible so that the mussel shells can open slightly permitting overpressure inside the mussel shells to escape, and which, when vacuum arises in the container as the steam condenses, molds itself to its contents so that the mussel shells are closed up and the space for spillage inside the container is minimized.

11. A device according to claim 4, wherein the venting opening is capable of being sealed manually or automatically by means of self-adhesive tape.

12. A device according to claim 9, wherein the container is a plastic can.

13. A device according to claim 9, wherein the container is a plastic bag.

14. A device according to claim 9, wherein the container is a plastic tray.

* * * * *